United States Patent [19]

Hunter

[11] Patent Number: 4,707,711
[45] Date of Patent: Nov. 17, 1987

[54] CHARACTER IMAGING SYSTEM

[75] Inventor: John H. Hunter, Ottawa, Canada
[73] Assignee: Lumonics Inc., Kanata, Canada
[21] Appl. No.: 863,439
[22] Filed: May 15, 1986
[51] Int. Cl.[4] ........................ G01D 9/42; H04N 1/04
[52] U.S. Cl. .................................. 346/108; 358/285; 358/296
[58] Field of Search .................. 346/108, 107 R, 76 L, 346/160; 358/296, 300, 302, 285

[56] References Cited

U.S. PATENT DOCUMENTS 3,909,103  9/1975  Graves .................................. 358/285
4,503,468  3/1985  Serinken .............................. 358/296

OTHER PUBLICATIONS

Higgins, Laser Processing of Semiconductors & Hybrids, vol. 611 of SPIE, Jan. 21, 1986, pp. 40–47.
Scaroni, Yag Laser: Making Its Mark on Metals, Jul. 1985, Design News.
Scaroni, Wafer Identification Marking, Nov. 1985, Microelectronic Manufacturing & Testing.

Primary Examiner—E. A. Goldberg
Assistant Examiner—Mark Reinhart

[57] ABSTRACT

In a character imaging system, a selected one of a plurality of different characters (letters, numerals, symbols etc.) arrayed as windows in an otherwise opaque mask, is projected optically onto a selected location on a working surface. In this manner, laser light can be used to burn an impression into a workpiece, with successive characters spelling out words and sentences. Alternatively, the system can be used to project non-coherent light onto photographic film or onto a screen. The improvement in this type of system provided by the invention resides in the avoidance of a need to move the mask, or the working surface, or the final lens that projects the light beam onto such surface. And yet the improved system nevertheless enables sequential selection of different characters in the mask, as necessary to build up words and sentences on the working surface. This improvement is achieved by scanning a light beam that is projected onto an imaging element (concave mirror or lens), while synchronously scanning mirrors that receive the imaged beam in such a manner that the final beam is projected onto the workpiece at a desired location regardless of which character-defining window in the mask is traversed by the beam.

12 Claims, 10 Drawing Figures

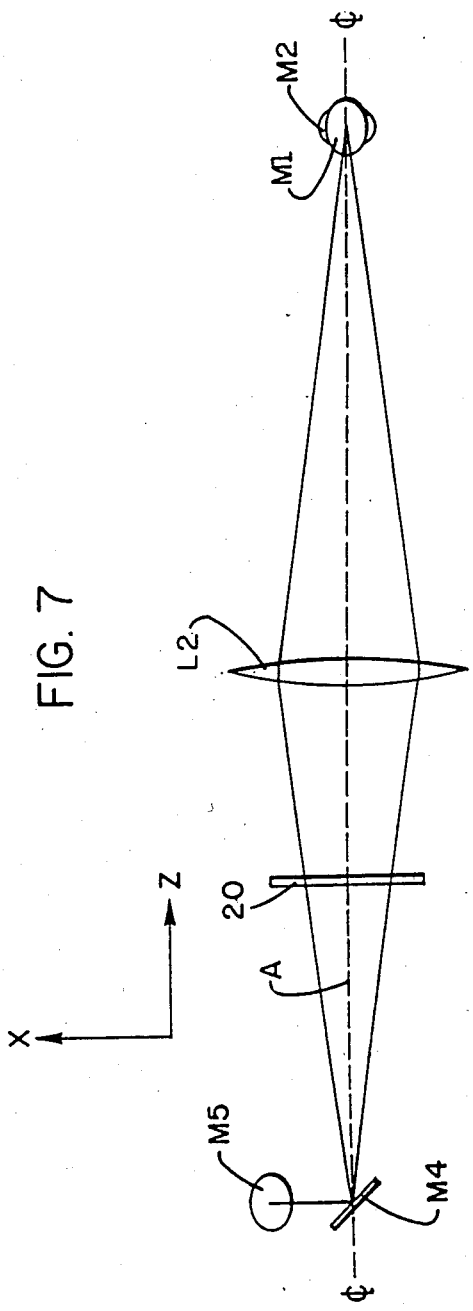

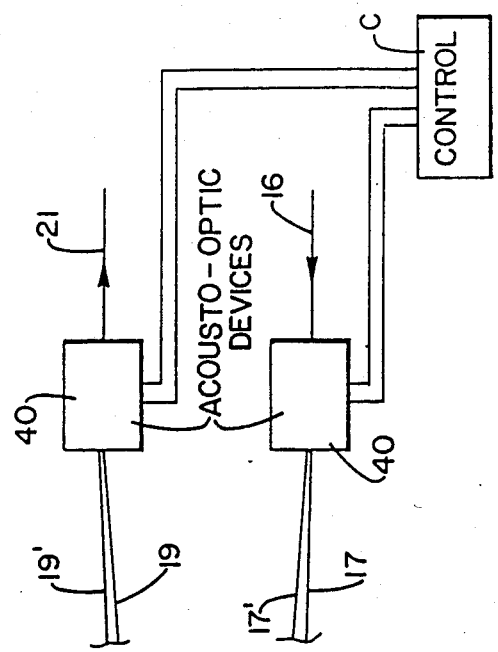
FIG. 10
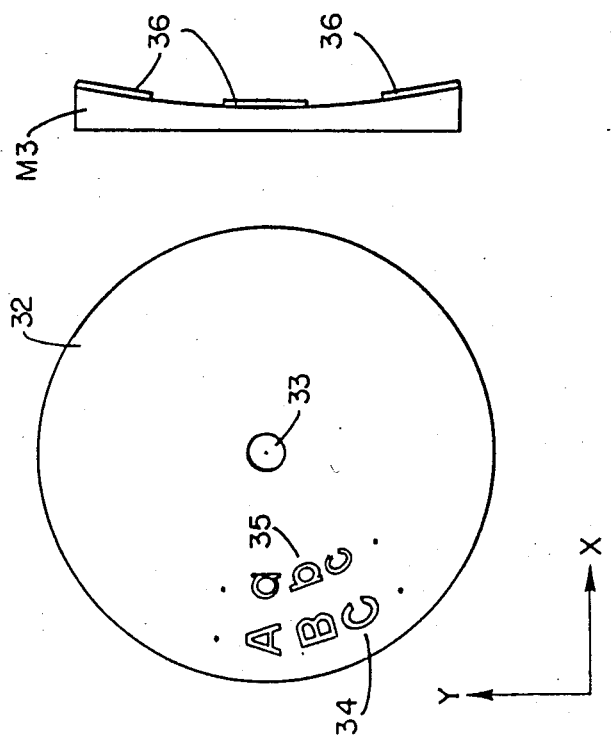
FIG. 9
FIG. 8

CHARACTER IMAGING SYSTEM

BACKGROUND TO THE INVENTION

The present invention relates to a character imaging system, the term "character" being used herein to refer to a letter of the alphabet, a numeral or other symbol.

More particularly, the invention is concerned with a system in which a selected one of a plurality of different such characters arrayed as windows in an otherwise opaque mask is projected optically onto a selected location on a working surface.

One important application for the present invention is in a system for marking a workpiece by means of laser light. The term "light" as used throughout this specification and claims is intended to cover not only visible light, but also infra-red and ultra violet light. High energy, pulsed (or continuous wave) coherent light is projected sequentially through selected character-defining windows in a mask to burn an impression of such characters into a workpiece. In known such system, either the workpiece is moved, or the beam is deflected by movement of the optical system, so that a word or sentence is written on the workpiece.

Another application of the present invention resides in the formation of words or messages that are projected onto a surface such as photographic film, or a screen, or on a larger scale, onto a wall, or even the side of a building, e.g. to provide a visual display. In these applications the light need not be coherent light. These latter applications of the invention nevertheless maintain the basic feature that the displayed message is generated by projecting a beam sequentially through different selected windows in a mask to spell out the message.

PRIOR ART

It is known in such systems to select the desired character by using a movable mask, e.g. a rotating disc, and either to move the workpiece or the display surface, or to move the final lens that projects the beam onto the working surface, such movements having been necessary in order to correctly select the beam impact location on the working surface and hence arrange the characters in a row (or rows) to form a word or sentence.

Any need to move the working surface is, however, often a serious complication in practice, and, in some cases, a practical impossibility. If the final lens is moved instead, the resulting equipment is complicated. The final lens will be relatively bulky, and closely controlling its physical movement demands expensive equipment. Movement of bulky elements also limits the speed of operation.

SUMMARY OF THE INVENTION

A principal object of the present invention is to provide a character imaging system that is capable of achieving improved performance without a need to move any one of the three important elements mentioned above, namely the mask, the final lens, or the working surface, although in some of its embodiments the invention does not preclude movement of one or more of these elements in circumstances in which a further special advantage can be achieved thereby.

BRIEF DESCRIPTION OF THE DRAWINGS

FIG. 7 is a further fragmentary view illustrating an alternative embodiment of the invention;

FIG. 8 is a view of an alternative form of mask;

FIG. 9 is a view of an alternative form of mirror; and

FIG. 10 is a fragment of FIG. 1 showing another modification.

DETAILED DESCRIPTION OF THE PREFERRED EMBODIMENTS

Referring first to FIGS. 1–4, the system provides a light source in the form of a laser 10. A beam 12 from the laser 10 enters a telescope 14 where it is reduced in width. For example, a typical TEA $CO_2$ pulsed laser would provide a beam of square cross-section with a width of about 1 inch in each direction. The telescope 14 will reduce this beam to a square beam with sides each about half an inch in width.

The thus narrowed beam 16 is directed in a direction X onto the surface of a flat circular mirror M1 that is controlled by a galvanometer G1 to rotate about an axis extending in a direction Z perpendicular to the direction X. The mirror M1 reflects the beam 16 onto a second similar mirror M2 that is controlled by a further galvanometer G2 to rotate about an axis extending in the X direction. The mirrors M1 and M2 form a first or "transmitting" assembly, the scanning function of which will be more fuly described below.

Figure 1:
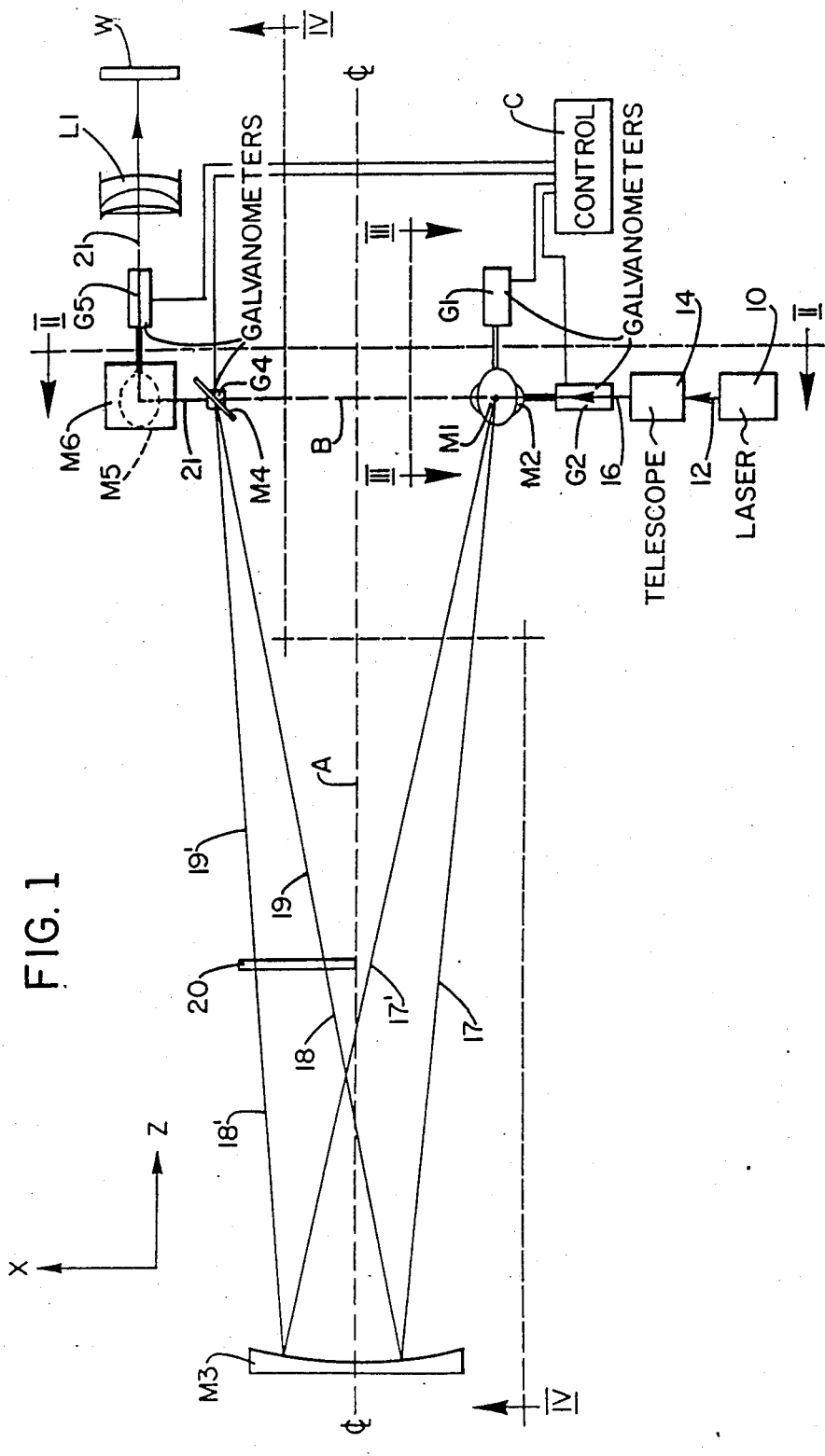
FIG. 1 is a schematic plan view of a preferred embodiment of the invention, i.e. as seen looking down on FIG. 4.
Figure 3:
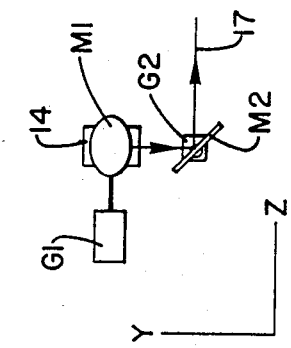
FIG. 3 is a view on the line III—III in FIG. 1.

As seen in FIG. 1, a parallel light beam 17 is projected by this transmitting assembly, generally in the direction Z, and onto the surface of a fixed, spherically concave mirror M3. The mirror M3 constitutes a "first imaging element" and serves to reflect a converging, focused beam 18 towards a second or "receiving" assembly that consists of further flat mirrors M4 and M5. The mirror M4 which directly receives the focused beam from the spherical mirror M3 is controlled by a galvanometer G4 to rotate about an axis in a direction Y (perpendicular to both the directions X and Z), and reflects the beam onto the mirror M5 which is controlled by a galvanometer G5 to rotate about an axis extending in the direction Z.

Figure 2:
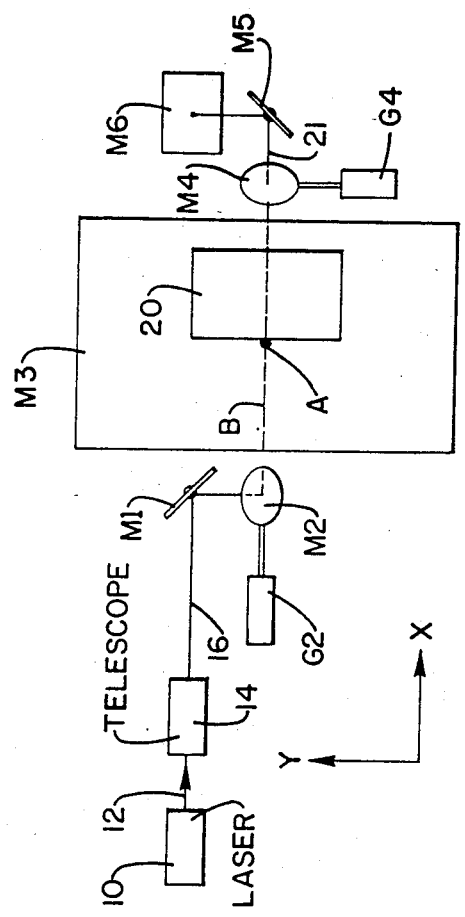
FIG. 2 is a view on the line II—II in FIG. 1.
Figure 4:
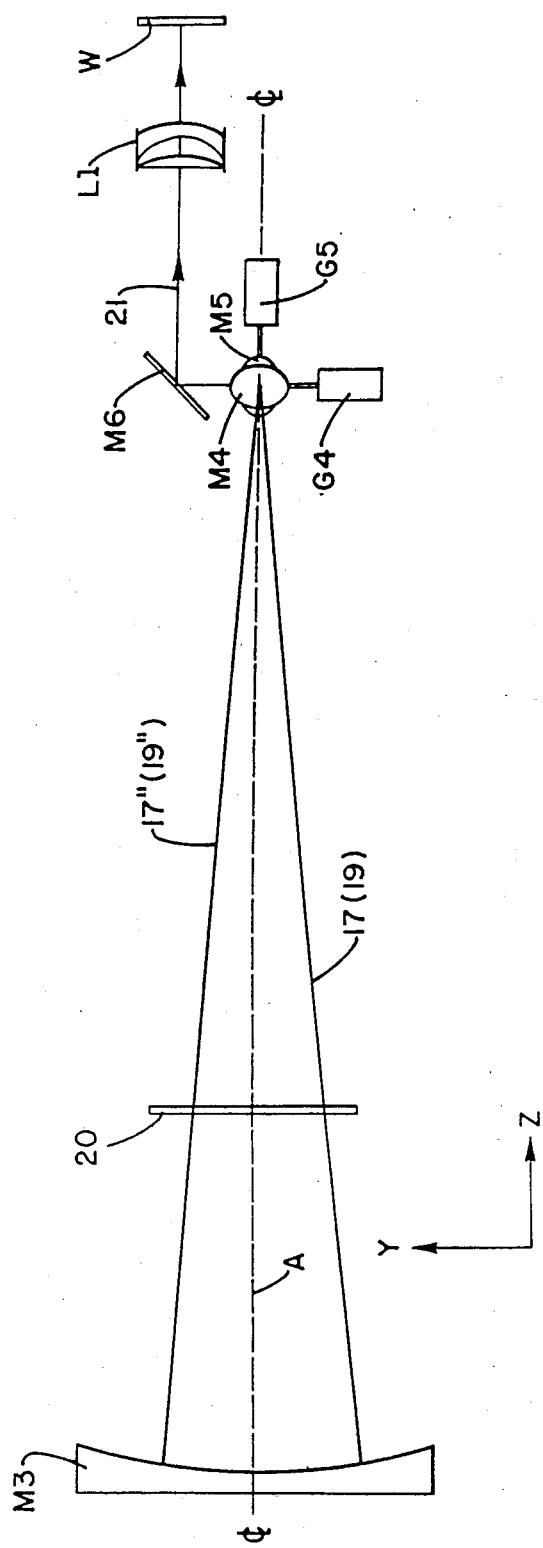
FIG. 4 is a view on the line IV—IV in FIG. 1.
Figure 5:
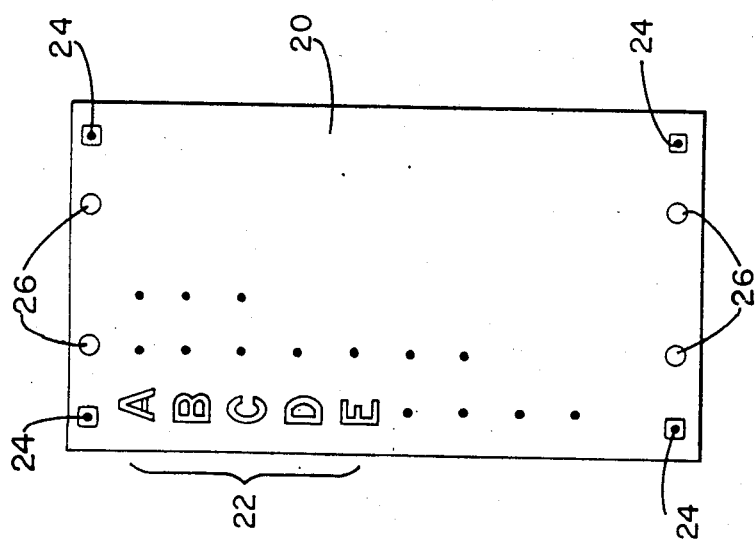
FIG. 5 is a view of a mask used in the apparatus of FIGS. 1–4.

During its passage from the spherical mirror M3 to the receiving assembly M4, M5, the beam 18 passes through a fixed mask 20 (see FIG. 5) to form a modified focused beam 19, i.e. a beam that has been modified by having passed through a window in the mask and hence having adopted the shape of one of the character-defining windows. The mask 20 is generally opaque, except for rows and columns of windows, each in the shape of a character 22, e.g. letters A, B, C etc. The geometry of the system is such, including the mask 20 being offset from the principal axis A of the mirror M3 (as best seen in FIGS. 1 and 2) that the transmitted beam 17 misses the mask, while the return beam 18 must pass through it to become the modified beam 19. The axis A extends in the direction Z and intersects a line B joining the centre points of the mirrors M2 and M4, i.e. the mirrors that respectively directly transmit the beam 16 to the mirror M3 and directly receive the beam 19 from the mirror M3. These axes A and B define a plane that extends in the X and Z directions. The axis B is spaced along the axis A from the mirror M3 by a distance 2f, where f is the focal length of the mirror M3. The mask 20 is preferably spaced from the mirror M3 by a distance slightly less than the focal length f, e.g. by a distance approximately equal to 0.8f.

As an alternative, the mask need not necessarily be located in the reflected beam 18. Instead it can be located in the transmitted beam 17. As a further alternative, the transmitted beam need not necessarily be a parallel beam. It could be a converging or diverging beam, in which case the beam reflected by the concave mirror M3 could be converging, diverging or parallel.

From the mirror M5, the beam 19, now conveniently referred to as a working beam 21 (and normally now diverging) passes to a fixed flat mirror M6 and then through a final lens L1 onto a workpiece W. The lens L1 constitutes a "second imaging element." Assuming that the workpiece W has a flat surface for receiving the beam, the lens L1 will preferably be a compound, flat field lens, i.e. one that will ensure that the image of the chosen mask character will be correctly focused on any selected area of the workpiece surface. Should the workpiece surface be appropriately concave, a normal lens could be used.

The function of the movable mirror M1 of the transmitting assembly is to scan the beam 17 in the X direction, e.g. between paths 17 and 17' shown in FIG. 1. The mirror M3 ensures that the reflected beam 19 or 19' (focused and modified to carry the character data) arrives at the mirror M4 regardless of whether the transmitted beam followed path 17 or 17', thus, in effect, regardless of which character in the mask was traversed by the beam. The mirror M4 of the receiving assembly is moved in synchronism with the mirror M1 of the transmitting assembly so as to seek the received beam 19 or 19' and to ensure that it is always reflected as the working beam in the same path 21 extending towards the mirror M5, subject to a superimposed incremental advance that will be described below.

In a similar manner, the mirrors M2 and M5 synchronously scan and seek the transmitted and received beams in the Y direction. See FIG. 4 where the transmitted and received beams are shown coincident, i.e. assuming no simultaneous X direction scanning, the beams being shown as scanned from 17 (transmitted) and 19 (received) to 17" and 19", rspectively. In practice, of course, scanning can take place in the X and Y directions simultaneously, if desired. The galvanometers G1, G2, G4 and G5 are controlled for this purpose by a control computer C, the receiving assembly always seeking the received beam in the correct direction having regard to its transmitted direction and the ultimate working beam path 21 that it is to follow. In this manner, the beam received by the workpiece can be caused to pass through any selected one of the characters in the mask, without any need to move the mask.

While in the illustrated embodiment the X scan mirrors come first in the direction of travel of the beam (i.e. mirrors M1 and M4) and the Y scan mirrors follow (mirrors M2 and M5) this sequence can be reversed provided it is done in both the transmitting and receiving assemblies.

The fixed spherical mirror M3 serves the dual functions of condenser and imager. As the so-called first imaging element, it images the transmitting assembly of mirrors M1, M2 onto the receiving assembly of mirrors M4, M5. The final lens L1, on the other hand, the so-called second imaging element, is spaced from the mask and the workpiece and has a focal length such as to ensure that it images the selected character in the mask 20 onto the workpiece W.

A spherical shape for the mirror M3 is preferred, because it is the cheapest to manufacture, but other concave shapes, such as ellipsoidal, could also be used.

Assuming that the system is to be used to mark a series of letters extending along at least one row on the surface of the workpiece W, i.e. one letter for each successive pulse of the laser 10, the control C will superimpose on the above described movements of the mirror M4 (for X direction movement) and of the mirror M5 (for Y direction movement), i.e. those necessary to keep the path 21 extending in a fixed direction, further incremental movements that move the path 21 in the manner necessary to achieve the desired distribution of the characters on the workpiece surface.

Calibration of the positions of the mirrors M1 and M2 of the transmitting assembly can be achieved by means of a plurality (preferably four) sensors 24 (FIG. 5) located at convenient places, e.g. the corners, of the mask 20. The galvanometers G1 and G2 will initially be programmed by the control C to scan until each one of these sensors 24 has been energised, thus serving to identify various orientations of the transmitted beam. To calibrate the positions of the mirrors M4 and M5 of the receiving assembly, a set of holes 26 is provided in the mask. As the beam passes through each such hole and is received and detected downstream, e.g. by a sensor (not shown) located at a datum point in the workpiece plane, the orientation of the working beam and hence of the mirrors M4 and M5 becomes known.

Figure 6:
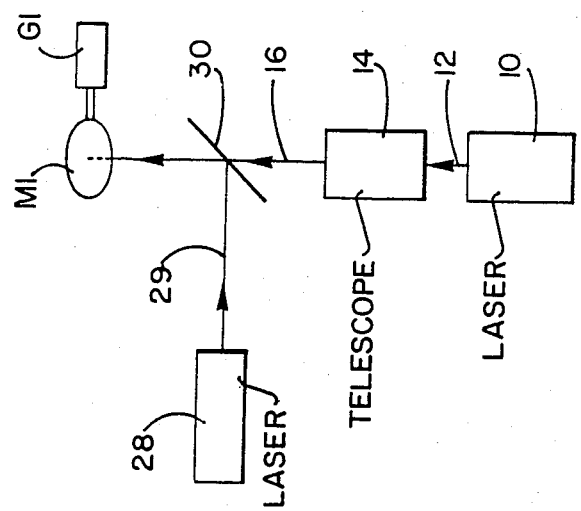
FIG. 6 is a fragment of FIG. 1 showing a modification.

If the main laser 10 is unsuited for this calibration purpose, e.g. is too powerful, or of an inappropriate wavelength, a subsidiary laser or lamp 28 can be used, its beam 29 being fed into the system by a beam combining element 30, e.g. a germanium flat, as shown in FIG. 6. A low power, Helium Neon, continuous wave laser, emitting visible red light, is a convenient choice as the subsidiary laser.

The invention is not dependent on the use of coherent light as the source, although this will normally be necessary when marking a workpiece. When using the system for display purposes or for marking photographic film the laser 10 can be replaced by a lamp.

As a further alternative, the mirror M3 can be replaced as the first imaging element by a lens L2, as shown in FIG. 7, with the two mirror assemblies M1, M2, M4, M5 then located symmetrically and equidistantly on opposite sides of such lens, with the mask 20 preferably, but not necessarily, located downstream of the lens. The preferred distance for each of the mirrors M2 and M4 from the lens L2 will be 2f, where f is the focal length of the lens. This arrangement has the advantage that the mask can be centered on the principal axis A of the lens. However, a significant advantage of the mirror M3 is that it will usually result in a more compact mechanical configuration.

One of the advantages of the present invention is that it enables effective scanning of a fixed mask to select a desired character and the positioning of an image of this character at a chosen location on a workpiece, or screen, or other surface. The term "work surface" is used in the claims that follow to refer generically to these various possibilities.

However, while the ability of the present invention to operate with a fixed mask is normally advantageous (for mechanical simplicity as well as for speed of operation), of even more value is its ability to operate with both a fixed work surface and a fixed final lens. Indeed, there are some embodiments of the invention in which there is an advantage in having the mask movable. For example, FIG. 8 shows a mask in the form of a disc 32 rotatable about an axis 33 and carrying two (or more) peripheral series 34, 35 of characters. Selection of a desired character is achieved by spinning the disc 32 and energising the laser when the selected character is in line with the beam. Increased speed of operation can be achieved by increasing the speed of rotation of the disc 32, or by repeating the alphabet (or other sequence of characters) around the disc. With this movement of the mask, which is assumed to take place in the direction Y where it intersects the beam, it no longer becomes necessary to scan the mirrors of the transmitting assembly in the Y direction. A single flat mirror rotatable about an axis extending in the direction Y, but otherwise similar to the mirror M1, will be used to provide scanning of the transmitted beam in the X direction. However, both X and Y direction scanning of the galvanometer operated mirrors M4 and M5 of the receiving assembly remain necessary in order to provide means for projecting the received beam into the desired location on the work surface.

FIG. 9 shows a further simplification that is especially appropriate for use with embodiments of the invention described in connection with FIG. 8, namely the substitution of a series of flat mirror surfaces 36 arranged in an approximately spherical array to furnish a mirror M3' that can be used to replace the mirror M3 as the first imaging element. The reason why this concave array of flat mirror surfaces can be used instead of a true concave surface, is that in the FIG. 8 embodiment there will be a relative small number of accessed character positions through which the beam must be scanned.

FIG. 10 shows an alternative device for use as either the transmitting assembly or the receiving assembly or both, namely an acousto-optical device 40 for scanning either beam in the X and Y directions.

I claim:
1. A character imaging system, comprising
   (a) a source of light,
   (b) a transmitting assembly for receiving an incoming light beam from said source and projecting a transmitted light beam,
   (c) a receiving assembly,
   (d) a first imaging element for receiving the transmitted beam from the transmitting assembly and for projecting said beam to the receiving assembly.
   (e) an opaque mask in the path of said beam, said mask having an array of windows each in the shape of a character, an image of which is to be projected onto a working surface,
   (f) the transmitting assembly including means for scanning the transmitted beam in two directions perpendicular to each other and both substantially perpendicular to the direction of extent of said transmitted beam whereby to cause the beam passing through the mask to pass through a selected one of said characters in said mask,
   (g) the spacing of said assemblies from the first imaging element and the focal length of said first imaging element being such that said first imaging element images the transmitting assembly onto the receiving assembly regardless of which character in the mask is traversed by said beam,
   (h) the receiving assembly including further scanning means synchronised with the means for scanning the transmitted beam for scanning the beam received from the first imaging element in two directions perpendicular to each other and both substantially perpendicular to the direction of extent of said received beam in order to form a working beam extending in a direction that is
      (i) independent of which character in the mask is traversed by said transmitted beam, and
      (ii) determined by a desired location on the working surface into which there is to be projected an image of the traversed character in the mask, and
   (i) a second imaging element for receiving the working beam and projecting said working beam onto the working surface,
   (j) the spacing of the mask and the working surface from the second imaging element and the focal length of the second imaging element being such as to project an image of the traversed character in the mask onto the working surface.

2. A system according to claim 1, wherein the transmitting assembly comprises
   (k) a pair of flat mirrors, a first one of which receives said incoming light beam from the source and a second one of which receives a reflected beam from said first mirror and projects said transmitted beam to the first imaging element substantially in a direction Z,
and wherein the scanning means of the transmitting assembly comprises
   (l) means for rotating one of said pair of flat mirrors for scanning the transmitted beam in a direction X perpendicular to the direction Z, and
   (m) means for rotating the other of said pair of flat mirrors for scanning the transmitted beam in a direction Y perpendicular to both the directions X and Z.

3. A system according to claim 2, wherein the receiving assembly comprises
   (n) a second pair of flat mirrors, a first one of which second pair receives the beam from the first imaging element and a second one of which second pair receives a reflected beam from said first mirror of the second pair and projects said working beam,
wherein said further scanning means of the receiving assembly comprises
   (o) means for rotating one of the second pair of mirrors for scanning the beam received from the first imaging element in the direction X, and
   (p) means for rotating the other of the second pair of mirrors for scanning the beam received from the first imaging element in the direction Y,
and wherein the system includes
   (q) control means for
      (i) synchronising rotation of the X direction scanning mirror of the transmitting assembly with that of the X direction scanning mirror of the receiving assembly and synchronising rotation of the Y direction scanning mirror of the transmitting assembly with that of the Y direction scanning mirror of the receiving assembly whereby to render the direction of extent of said working beam independent of the paths followed by said beam and hence independent of the traversed character in the mask, and (ii) additionally rotating at least one of the mirrors of the receiving assembly to modify said direction of extent of the working beam for projecting said working beam onto said desired location on the working surface.

4. A system according to claim 1, wherein at least one of said transmitting and receiving assemblies comprises an acousto-optical device.

5. A system according to claim 1, wherein
 (k) the first imaging element is a concave mirror having a principal axis.
 (l) the transmitting and receiving assemblies each being positioned from said concave mirror in the general direction of said axis at a distance substantially equal to twice the focal length of said concave mirror, said assemblies being respectively displaced to opposite sides of said axis.

6. A system according to claim 1, wherein
 (k) the first imaging element is a lens,
 (l) the transmitting and receiving assemblies being positioned on opposite sides of the lens each at a distance from the lens substantially equal to twice the focal length of said lens.

7. A character imaging system, comprising
 (a) a source of light,
 (b) a transmitting assembly for receiving an incoming light beam from said source and projecting a transmitted light beam,
 (c) a receiving assembly,
 (d) a first imaging element for receiving the transmitted beam from the transmitting assembly and for projecting said beam to the receiving assembly,
 (e) an opaque mask in the path of said beam, said mask having an array of windows each in the shape of a character, an image of which is to be projected onto a working surface,
 (f) the transmitting assembly including means for scanning the transmitted beam in a first direction substantially perpendicular to the direction of extent of said transmitted beam,
 (g) means for moving the mask in a second direction perpendicular to said first direction and substantially perpendicular to the direction of extent of said transmitted beam,
 (h) said means for scanning the transmitting assembly and said means for moving the mask together causing the beam passing through the mask to pass through a selected one of said characters in said mask,
 (i) the spacing of said assemblies from the first imaging element and the focal length of said first imaging element being such that said first imaging element images the transmitting assembly onto the receiving assembly regardless of which character in the mask is traversed by said beam,
 (j) the receiving assembly including further scanning means synchronised with the means for scanning the transmitting assembly, for scanning the beam received from the first imaging element in two directions perpendicular to each other and both substantially perpendicular to the direction of extent of said received beam in order to form a working beam extending in a direction that is (i) independent of which character in the mask is traversed by said transmitted beam, and
(ii) determined by a desired location on the working surface onto which there is to be projected an image of the traversed character in the mask, and (k) a second imaging element for receiving the working beam and projecting said working beam onto the working surface,
(l) the spacing of the mask and the working surface from the second imaging element and the focal length of the second imaging element being such as to project an image of the traversed character in the mask onto the working surface.

8. A system according to claim 7, wherein
 (m) the first imaging element is a concave mirror having a principal axis,
 (n) the transmitting and receiving assemblies each being positioned from said concave mirror in the general direction of said axis at a distance substantially equal to twice the focal length of said concave mirror, said assemblies being respectively displaced to opposite sides of said axis.

9. A system according to claim 7, wherein
 (m) the first imaging element is a lens,
 (n) the transmitting and receiving assemblies being positioned on opposite sides of the lens each at a distance from the lens substantially equal to twice the focal length of said lens.

10. A system according to claim 7, wherein
 (m) the first imaging element is a concave array of flat mirrors, said concave array defining a principal axis,
 (n) the transmitting and receiving assemblies each being positioned from said concave array in the general direction of said axis at a distance substantially equal to twice the focal length of said concave array, said assemblies being respectively displaced to opposite sides of said axis.

11. A system according to claim 7, wherein the transmitting assembly comprises
 (m) a flat mirror for receiving the incoming light beam from the source and projecting the transmitted beam to the first imaging element,
and wherein the scanning means of the transmitting assembly comprises
 (n) means for rotating said flat mirror for scanning the transmitted beam in said first direction.

12. A system according to claim 11, wherein the receiving assembly comprises
 (o) a pair of further flat mirrors, a first one of which pair receives the beam from the first imaging element and a second one of which pair receives a reflected beam from said first mirror of the pair and projects said working beam,
wherein said further scanning means of the receiving assembly comprises
 (p) means for rotating one of said pair of mirrors for scanning the beam received from the first imaging element in said first direction, and
 (q) means for rotating the other of said pair of mirrors for scanning the beam received from the first imaging element in said second direction,
and wherein the system includes
 (r) control means for
  (i) synchronising rotation of the mirror of the transmitting assembly with that of the mirror of the receiving assembly for scanning in said first direction and synchronising movement of the mask in said second direction with that of the mirror of the receiving assembly for scanning in said second direction, whereby to render the direction of extent of said working beam independent of the paths followed by said beam and hence independent of the traversed character in the mask, and (ii) additionally rotating at least one of the mirrors of the receiving assembly to modify said direction of extent of the working beam for projecting said working beam onto said desired location on the working surface.

* * * * *